US008270032B2

(12) United States Patent
Benedicto et al.

(10) Patent No.: US 8,270,032 B2
(45) Date of Patent: Sep. 18, 2012

(54) GENERATING COLOR LOOKUP TABLE

(75) Inventors: Jordi Arnabat Benedicto, L'Arboç Tarragona (ES); Peter Morovic, Sant Cugat del Valles Barcelona (ES); Jan Morovic, Colchester Essex (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 12/605,802

(22) Filed: Oct. 26, 2009

(65) Prior Publication Data

US 2011/0096365 A1   Apr. 28, 2011

(51) Int. Cl.
*H04N 1/40* (2006.01)

(52) U.S. Cl. ...... 358/3.23; 358/1.9; 358/3.06; 358/3.08; 358/3.09; 358/504

(58) Field of Classification Search ............... None
See application file for complete search history.

(56) References Cited

U.S. PATENT DOCUMENTS

| | | | |
|---|---|---|---|
| 5,416,890 A | 5/1995 | Beretta | |
| 5,450,216 A | 9/1995 | Kasson | |
| H1506 H | 12/1995 | Beretta | |
| 5,553,199 A | 9/1996 | Spaulding et al. | |
| 5,583,666 A | 12/1996 | Ellson et al. | |
| 5,809,213 A | 9/1998 | Bhattacharjya | |
| 5,872,898 A * | 2/1999 | Mahy | 358/1.9 |
| 6,229,626 B1 | 5/2001 | Boll | |
| 6,381,361 B1 | 4/2002 | Silverbrook et al. | |
| 6,459,425 B1 | 10/2002 | Holub et al. | |
| 6,480,299 B1 | 11/2002 | Drakopoulos et al. | |
| 6,654,143 B1 * | 11/2003 | Dalal et al. | 358/1.9 |
| 6,724,500 B1 | 4/2004 | Hains et al. | |
| 6,972,869 B2 | 12/2005 | Harrington | |
| 7,075,643 B2 | 7/2006 | Holub | |
| 7,110,142 B2 * | 9/2006 | Mestha et al. | 358/1.9 |
| 7,177,465 B1 | 2/2007 | Takahira | |
| 7,233,413 B2 | 6/2007 | Jones et al. | |
| 7,411,701 B2 | 8/2008 | Boll | |
| 7,421,117 B2 | 9/2008 | Kondo et al. | |
| 7,483,171 B2 * | 1/2009 | Agar et al. | 358/1.9 |
| 7,742,204 B2 * | 6/2010 | Kuhn et al. | 358/504 |
| 7,929,188 B2 * | 4/2011 | Kuno | 358/523 |
| 8,085,438 B2 * | 12/2011 | Hersch et al. | 358/3.09 |
| 2002/0140701 A1 * | 10/2002 | Guyler | 345/501 |
| 2008/0259400 A1 * | 10/2008 | Hersch et al. | 358/2.1 |
| 2009/0310154 A1 * | 12/2009 | Morovic et al. | 358/1.9 |
| 2010/0214567 A1 * | 8/2010 | Shtatnov | 356/432 |
| 2010/0277493 A1 * | 11/2010 | Tin | 345/589 |
| 2010/0277752 A1 * | 11/2010 | Tin | 358/1.9 |
| 2011/0096345 A1 * | 4/2011 | Benedicto et al. | 358/1.9 |

OTHER PUBLICATIONS

U.S. Appl. No. 12/390,214.
C. Bradford Barber, David P. Dobkin and Hannu Huhdanpaa: The Quickhull Algorithm for Convex Hulls; ACM Transactions on Mathematical Software; Dec. 1996; pp. 1-15: vol. 22 No.
K. Schittkowski; NLPQL: A Fortran Subroutine Solving Constrained Nonlinear Programming Problems; Annals of Operations Research: Jun. 1985; pp. 485-500; No. 5; J. C. Raltzer A.G.

* cited by examiner

Primary Examiner — Dung Tran

(57) ABSTRACT

Method of generating a CIElab to Neugebauer Primary area coverages interface for a print system, comprising selecting area coverages of Neugebauer Primaries and printing corresponding patches, measuring the CIE XYZ coordinates of the patches, converting the CIE XYZ coordinates to corresponding CIE Lab coordinates, and relating the CIE Lab coordinates to the NPacs.

4 Claims, 4 Drawing Sheets

GENERATING COLOR LOOKUP TABLE

BACKGROUND OF THE INVENTION

Traditional color separation pipelines are designed to process a contone CMYK (Cyan, Magenta, Yellow, Black) and/or RGB (Red, Green, Blue) image data input so that it can be converted to ink halftone output. Usually, the color separation is arranged to specify how the contone interface relates to ink-channels. For example, for a CMYKcm (Cyan, Magenta, Yellow, Black, Light Cyan, Light Magenta) ink system the separation is set up so as to convert a C contone channel into a portion of cyan and a portion of light cyan, and this works similarly for magenta.

Furthermore, to accurately reproduce a desired target color using a printing system, an operator must perform repeated color adjustments by trial and error. In particular, the operator might adjust the color of an image on a video display in an attempt to obtain the desired target color on a color printer. After printing that first image using the color printer, the operator must perform a second color adjustment on the video display, wherein the adjustments are based on observations of the first printed image. This process would be repeated until the desired color print is output.

Such trial and error generally involves the process of color separation. In the past, color separation has traditionally been a matter of deciding what quantities of each of several inks (or other colorants) to use to achieve a given color. While this functionality was originally a photochemical process involving colored filters, it has evolved to its current state, which utilizes look-up tables comprising colorimetric input values or input values in a device color space. The output values for the tables may be n-dimensional ink vectors, where n is the number of inks used by the printer and the vector components represent quantities of each ink available on the color printer. In practice, the current approach utilizes these tables to transform ink amounts for each color plane, thereby reproducing the desired target color.

However, controlling print color by variation of ink amounts is a highly non-linear process, deriving from a complex relationship between changes in the quantity of each ink color used and the color of the resulting printed ink combination. As a result of this non-linearity, the gamut (the set of all printable colors) of a printing device may also include concavities when plotted in a three dimensional color space. These concavities in some cases result in only relatively dull dark colors being printable. In addition, small changes in a system comprising non-linear relationships may also result in unacceptably large changes in output color. Therefore, non-linear relationships in a printing system may make it very challenging to obtain printing properties such as smooth transitions between colors, cost per copy, color constancy, and grain.

Therefore, there is a need for improving color printing in a printing system, and in particular color reproduction accuracy. Furthermore, there may a need to provide for adapted color input processing in a print system pipeline.

BRIEF DESCRIPTION OF THE DRAWINGS

For the purpose of illustration, certain embodiments of the present invention will now be described with reference to the accompanying diagrammatic drawings, in which.

DETAILED DESCRIPTION

Figure 1:
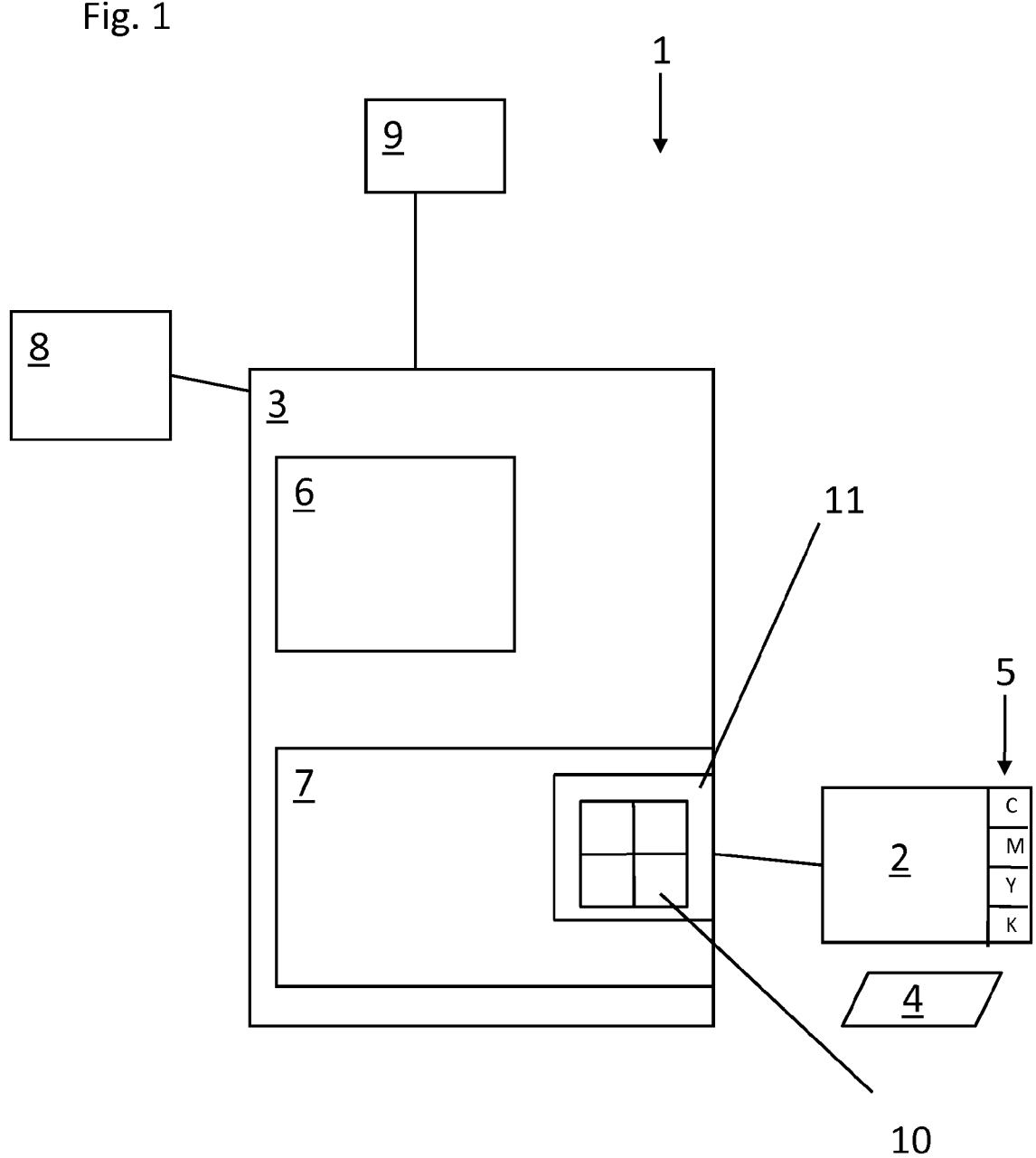
FIG. 1 shows a schematic diagram of a print system.

In the following detailed description, reference is made to the accompanying drawings. The embodiments in the description and drawings should be considered illustrative and are not to be considered as limiting to the specific embodiment of element described. Multiple embodiments may be derived from the following description through modification, combination or variation of certain elements. Furthermore, it may be understood that also embodiments or elements that may not be specifically disclosed may be derived from the description and drawings.

This disclosure describes various exemplary methods and computer products for printing a document in a printing system. In particular, this disclosure describes selecting certain Neugebauer Primaries (NPs) and Neugebauer Primary area coverages (NPacs) to optimize a printing process according to a certain print attribute.

Use of NPs and NPacs is disclosed in U.S. patent application Ser. No. 12/390,214, filed 20 Feb. 2009, not yet published at filing the present application, the contents of which are included herein by reference.

In one embodiment, the Neugebauer Primaries are the possible combinations of a set of n inks. Each ink within the set may be at one of k levels for a single halftone pixel, where there are $k^n$ combinations for each ink set defining all of the possible ink configuration states that a single halftone pixel can have. For example, where k=2 for a binary (or bi-level) printer, the printer is able to use either no ink or one drop of ink at a single pixel per ink channel. For example, where n=2 the printer would have two ink channels, for example Cyan (C) and Magenta (M). The possible combinations would then be White (W), C, M and CM, being $k^n=2^2=4$ possible combinations. For example, for a printer comprising six different inks and the ability to place either 0, 1, or 2 drops of each ink at each halftone pixel, resulting in $3^6$ or 729 NPs. A certain color may correspond to a certain NPac, which may be represented as a vector, wherein [W, C, M, CM]=[a(area)$_W$%, $a_C$%, $a_M$%, $a_{CM}$%], where $a_W$%+$a_C$%+$a_M$%+$a_{CM}$%=100%.

NPacs may be represented by linear, convex combinations of NPs, wherein the relative area coverages over a unit area are the convex weights. An NPac may also represent a single NP, that NP having a 100% area coverage weight and the other NPs being at 0%. According to an embodiment in this disclosure, all of a printing system's NPacs are accessible, so the full color gamut of a printing system can be addressed.

The present disclosure may relate to, as further described in U.S. patent application Ser. No. 12/390,214, printing and measuring up to all of an ink set's Neugebauer primaries (NPs), computing the convex hull of the measurements, tessellating the convex hull using at least the convex hull vertices, and for any color inside the convex hull, finding the enclosing tetrahedron and determining the weights with which the vertices can be combined to give the chosen color, where the weights are the relative area coverages needed for each of the vertex NPs. Area coverages of NPs are referred to as NPacs in this disclosure.

In print systems using NPacs, it may be determined how much of a certain area to cover with certain specified NPs. Instead of ink vectors, NPacs may be output of a color separation process, and input to a halftoning step. Then, single NPs may be selected from the NPacs for each halftone pixel.

Since NPacs may be convex combinations of NPs, the set of selected NPacs may be convex. Furthermore, since NPacs relate linearly to CIE XYZ colorimetry, the convexity of the NPac gamut may result in a convex CIE XYZ color gamut. Such NPacs may be linearly related to a CIE XYZ colorimetric space or a transformation thereof.

While NPacs relate linearly to CIE XYZ values, there is no linear relationship between NPacs and CIE Lab values. Furthermore, it is known that a CIE Lab interface may be better suitable as a perceptual connection space than a CIE XYZ interface. This may make a color separation process that takes CIE XYZs as inputs not readily applicable, or not preferable, in existing print system pipelines. Since in a method of outputting NPacs, such as described in U.S. patent application Ser. No. 12/390,214, no control is given to a contone CMYK/RGB interface, processing typical input digital image data may be impractical. It has been found that a conversion from CIE Lab to CIE XYZ and/or NPacs may be convenient for such color separation to work in practice. Therefore, this disclosure may relate to building a CIE Lab contone interface to an NPac color separation. Such interface may be incorporated into an existing image printing pipeline.

Therefore, amongst others, the present disclosure describes a method of generating a CIE Lab to NPac interface for a print system. The method may comprise selecting area coverages of NPs (NPacs) and printing corresponding patches, measuring the CIE XYZ coordinates of these patches, converting the CIE XYZ coordinates to corresponding CIE Lab coordinates, and relating the CIE Lab coordinates to the NPacs. Said interface may comprise a look up table for mapping CIE lab coordinates to NPacs, wherein the CIE Lab space may be mapped as the indexing space and NPacs as the nodes.

FIG. 1 illustrates an exemplary printing system 1. The print system 1 may comprise a printer 2 of a predetermined type. Without intending to limit to a specific type of printer 2, the printer 2 may comprise a large or small format printer, a laser printer, an inkjet printer, an offset printer, a digital press, a dot-matrix printer, a line printer, and/or a solid ink printer.

The printing system 1 can be driven, at least in part, by one or more suitable computing devices 3. Computing devices 3 that may be used include, but are not limited to, a personal computer, a laptop computer, a desktop computer, a digital camera, a personal digital assistance device, a cellular phone, a video player, and other types of image sources.

The printer 2 may comprise a print head arranged to print on a substrate 4. The substrate 4 may comprise any type of substrate, for example, but not limited to, paper, films, foils, textiles, fabrics or plastics. The printer 2 may comprise, or be connected to, a certain ink set 5. The ink set 5 may comprise a predetermined number of inks, for example four inks which may be Cyan, Magenta, Yellow and Black (CMYK). The ink set 5 may be determined by the printer 2, wherein different printers 2 correspond to different ink sets 5, or different ink sets 5 may be applied in one printer 2.

The computing device 3 may be physically integrated with or connected to the print system 1. The computing device 3 may be arranged to process image data. The computing device 3 may be arranged to separate and/or convert colors. The computing device 3 may comprise a processing circuit 6 and a storage device 7. The storage device 7 may facilitate any type of computer data storage. The storage device 7 may comprise, but should not be limited to, any type non-volatile memory such as a hard disk, a solid state storage device, a ROM (Read Only Memory), an exchangeable data carrier, etc. The storage device 7 may store data, drivers, and computer programs, amongst others. For example, in this disclosure input digital image data for printing may be retrieved from the storage device 7, a remote storage location 8, such as an online application, using the Internet, and/or a local area network. Furthermore, a graphical user interface 9 may be provided for allowing an operator to change or interact with the print system 1.

A look up table 10 may be provided, that has mapped CIE Lab coordinates in relation to NPacs. In the table 10, the CIE Lab coordinates may form the indexing space and the NPacs may form the nodes. The look up table 10 may be stored in a print system or computing device interface 11, for example a print system driver, or a storage device 7. The table 10 may be stored in software running on the computing device 3, and/or on a remote storage location 8.

Certain features of the print system 1 may influence an outgoing printed color for a given color image data input, for example a CMYK or RGB data. For example, specific ink, a specific ink set 5, and/or a type of substrate 4 may influence the printed color output. In this description, these features are regarded as components of the print system 1. The table 10 may be generated in correspondence with a specific print system 1, for example in correspondence with a specific printer 2, ink set 5 and/or substrate 4.

The printing system 1 may employ an embodiment of a color separation interface and image processing system referred to as Halftone Area Neugebauer Separation (HANS), as described in U.S. patent application Ser. No. 12/390,214.

Figure 2:
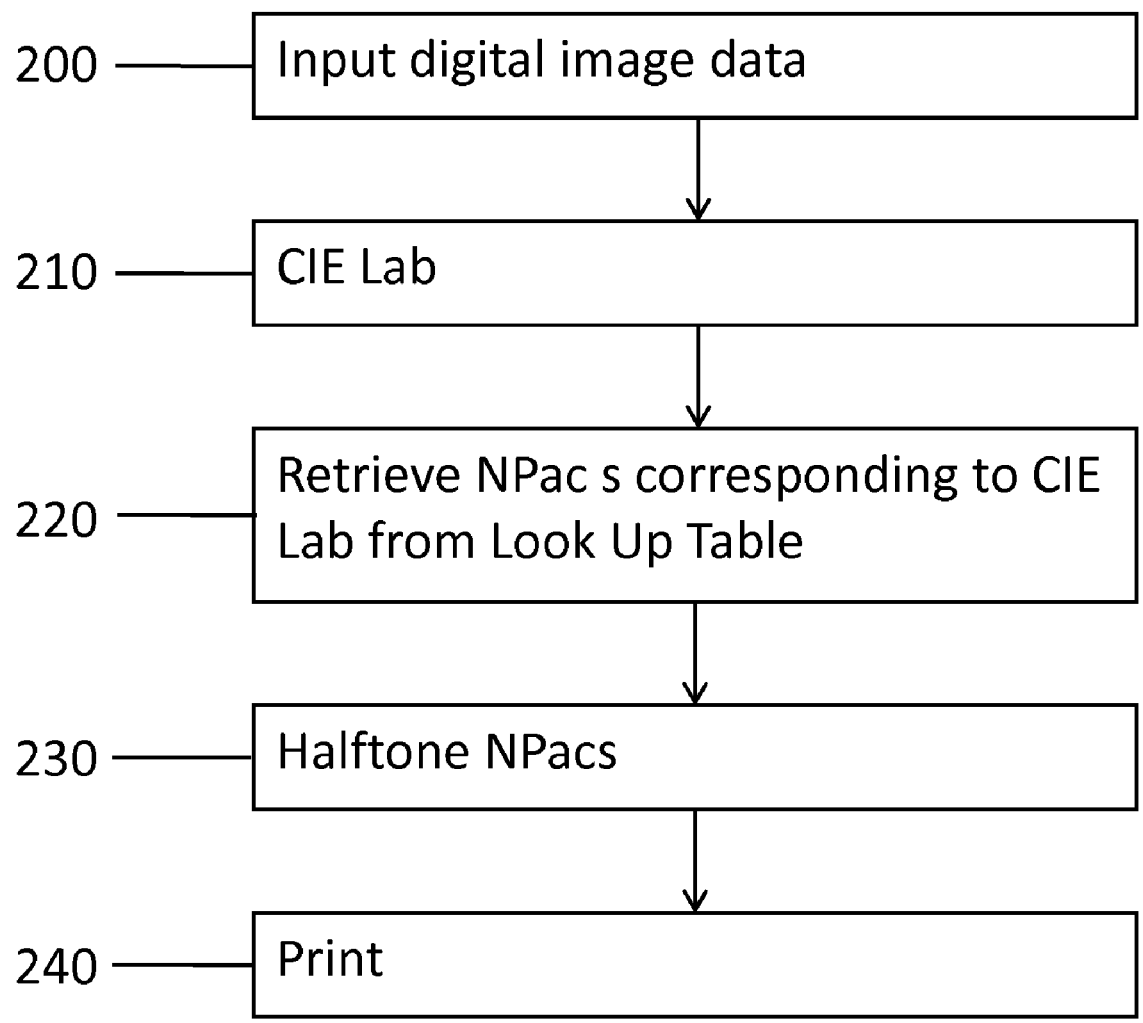
FIG. 2 shows a flow chart of a printing process.

FIG. 2 illustrates method of passing image data through a printer pipeline, including a color separation process and a halftoning process. In step 200, input digital image data may be provided to the print system 1. For example, the image may be received through a network or a data carrier. The image may be processed in the print system 1 pipeline. The input image data may comprise RGB and/or CMYK data or the like. In step 210, this input image data may be converted to CIE Lab data. The CIE Lab data may be derived from the image in a known manner, for example using ICC (International Color Consortium) color management. Herein, an ICC profile may be used to convert RGB or CMYK image data to CIE Lab data, for example by using a predetermined look up table.

In step 220, the CIE Lab data may be mapped to corresponding NPacs by referring to the table 10. The respective CIE Lab value and the corresponding NPac value may relate to a corresponding color. The table 10 may have linked CIE Lab values to corresponding NPacs, wherein the CIE Lab coordinates are indexing space and the NPacs are nodes. The CIE Lab data may be mapped to the corresponding NPac by interpolating within table 10. In an embodiment, the respective NPacs in the table 10 may be optimized for given ink limits, and/or for certain print attributes such as minimal ink usage, color constancy and/or grain. A method of generating such table 10 is described below.

In a next step 230, the retrieved NPacs may be communicated to a halftoning process. The halftoning may comprise outputting one Neugebauer Primary (NP) per halftone pixel. Halftoning may be used to define a spatial arrangement of the NPs specified in the input NPac vectors. For example, Vector Error Diffusion or Device State Error Diffusion (DSED) may be applied as a halftoning technique, wherein the NPs are its states and the error is diffused in the NPac space. Halftoning is a well known process. Halftoning in relation to NPacs is described in U.S. patent application Ser. No. 12/390,214. As an example, halftoning may be described as follows. An NPac may specify a certain distribution of NPs by corresponding relative area coverages, for each unit area. However, each pixel may only have one corresponding NP. For instance, if the printer 2 attempts to have 50% of a cyan NP and 50% of a magenta NP at a single pixel and the halftoning chooses to use the magenta NP at that pixel, there will be 50% too little of the cyan NP and 50% too much of the magenta NP, and an error will therefore be the result. In certain halftoning techniques such as DSED, the difference between the desired NPac and the NP placed may be distributed or diffused using known error diffusion methods to one or more neighboring pixels. Example error diffusion methods include, but are not limited to, error randomization, serpentine processing, and the like.

After halftoning, one NP may be output per halftone pixel, wherein the respective NPs may be arranged in an advantageous manner. In step 240, the input image may be printed as a hard copy. The NPs may have been distributed by halftoning, e.g. one NP per halftone pixel, so that the ink drops corresponding to the NPs may be distributed onto the substrate 11.

Figure 3:
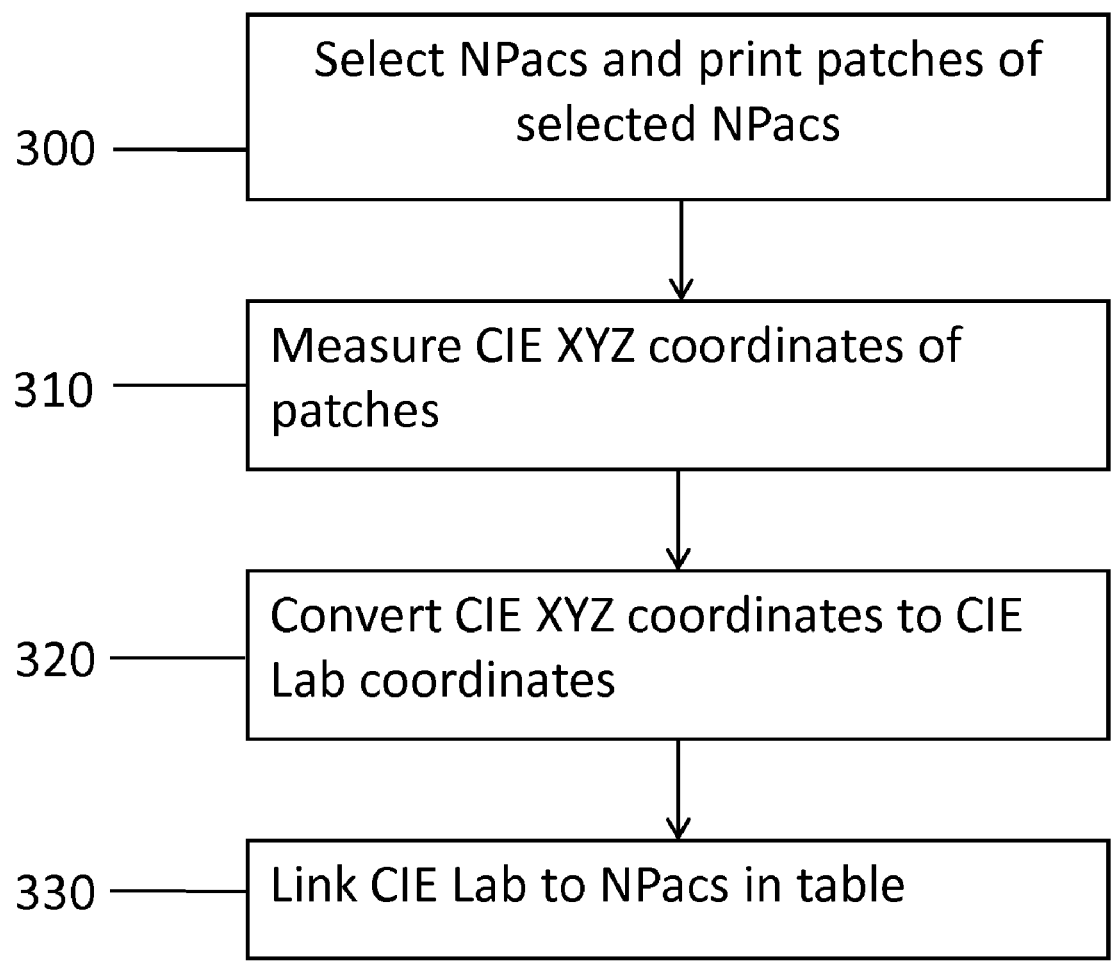
FIG. 3 shows a flow chart of a method of building a CIE Lab to NPac interface.

A method of generating a CIE Lab to NPac interface for a print system is explained with reference to FIG. 3. In step 300, a set of NPacs may be selected, printed and measured. Patches of the NPacs may be printed and measured. NPacs may be selected such that they sample the ink restricted color space. The chosen NPacs may be optimized according to the specific print system 1.

The CIE XYZ coordinates of the printed patches may be measured in step 310. In step 320, the CIE XYZ coordinates may be converted and linked to corresponding CIE Lab coordinates. In step 330, the CIE Lab coordinates may be linked to the NPacs that correspond to the respective CIE XYZ coordinates, so that a CIE Lab to NPac interface may be achieved. Furthermore, a CIE Lab to NPac conversion table 10 may be generated.

Figure 4:
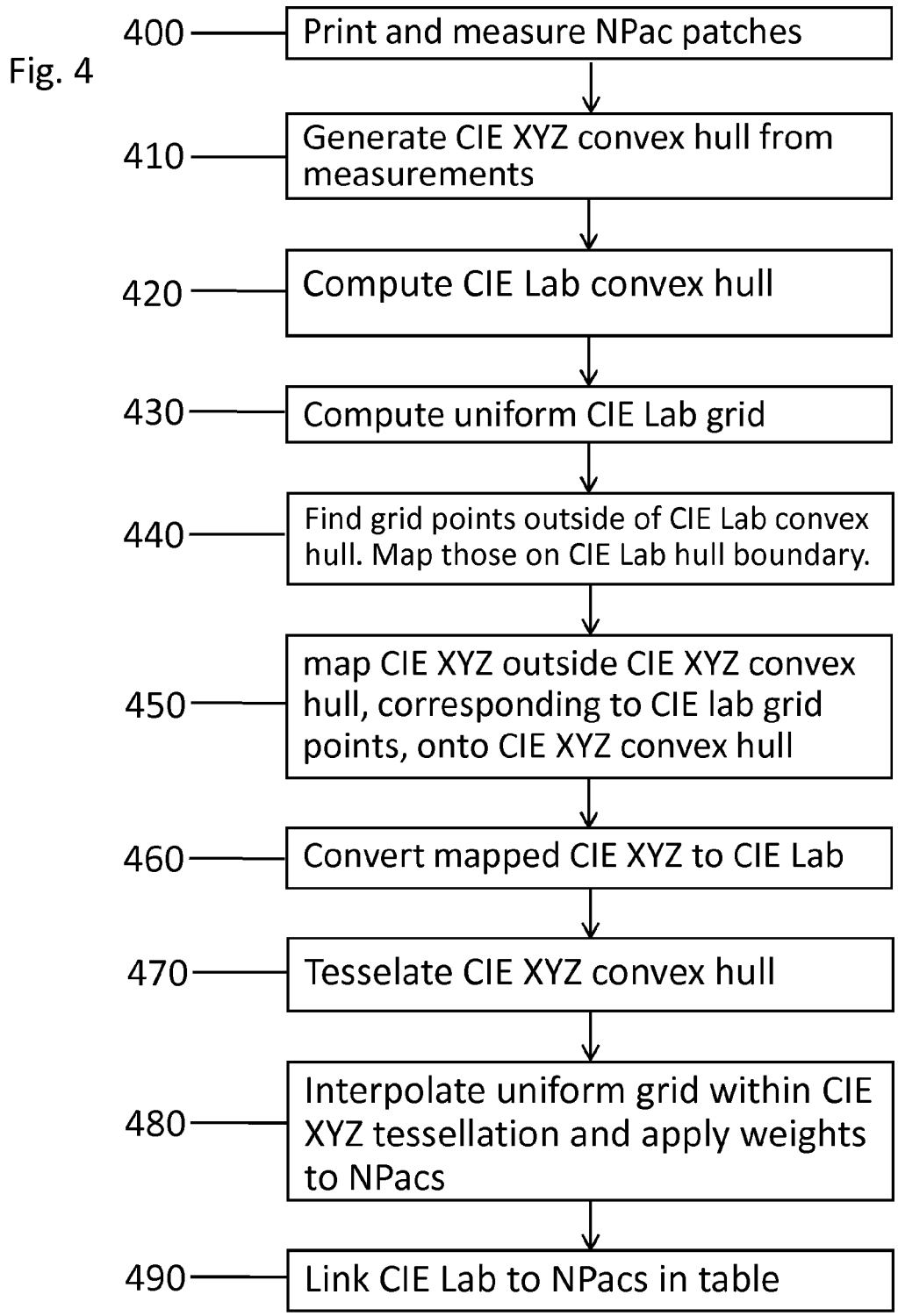
FIG. 4 shows flow chart of a further method of building a CIE Lab to NPac interface.

A further embodiment of a method of generating a CIE Lab to NPac for the print system 1 is explained with reference to FIG. 4. In this embodiment, patches of NPacs may be selected and printed, for a certain print system 1, as indicated by step 400. The colorimetry of these NPacs may be measured and expressed in CIE XYZ.

From the measurements a convex hull may be generated in a CIE XYZ space, as indicated by step 410. This may define the full color gamut for the pipeline of the print system 1. Instead of CIE XYZ, a convex hull may be generated in a modified XYZ space, for example through a Yule-Nielsen model.

Furthermore, a CIE Lab convex hull may be generated for the print system 1, as indicated by step 420. As indicated by step 430, a uniform CIE Lab grid may be computed. The grid may have a predetermined resolution. For example the grid may have a predetermined number of nodes per dimension. At this stage, the CIE Lab grid points may extend beyond the boundary of the CIE Lab convex hull as obtained in step 420. The CIE Lab grid may at least cover the entire theoretically possible CIE Lab space to be able to achieve a mapping for any CIE Lab value from input image data.

As indicated by step 440, CIE Lab grid points that are outside the CIE Lab convex hull may be found. Note that the CIE Lab convex hull corresponds to the CIE Lab gamut in this context. The grid points outside the CIE Lab convex hull and/or gamut may be mapped onto the convex hull boundary. This may be achieved by calculating the respective Minimum Euclidian Distances in CIE Lab space, for example using Minimum CIEDE1976 gamut mapping. At this stage, the CIE Lab grid points may be within, or on the boundary of, the CIE Lab convex hull.

In a step 450, the CIE XYZ coordinates that correspond to the CIE Lab grid points may be found. The CIE XYZ coordinates that correspond to CIE lab grid points that are outside of the CIE XYZ convex hull, may be found and mapped onto the CIE XYZ convex hull. The CIE XYZ coordinates outside the CIE XYZ convex hull may be mapped by calculating the respective Minimum Euclidian Distances in the XYZ space.

As indicated by step 460, the mapped CIE XYZ coordinates may be converted into CIE Lab. At this stage, all CIE Lab grid points may have a CIE XYZ equivalent that is in or on the CIE XYZ convex hull.

As indicated by step 470, the convex hull of CIE XYZ coordinates may be tessellated, for example using Delaunay tessellation. In step 480, the CIE XYZ coordinates that correspond to the CIE LAB grid points, may be interpolated for example using tetrahedral interpolation, by using the tessellation of step 470.

At this stage, since the NPacs relate linearly to the CIE XYZ coordinates, the CIE Lab grid points may be linked to NPacs. For the print system 1, a look up table 10 may be generated that has mapped CIE Lab coordinates (e.g. said grid points) to NPacs, as indicated by step 490. In this table 10, the CIE Lab coordinates may form the indexing space and the NPacs may form the nodes.

In an embodiment, a modified CIE XYZ space may be used, instead of a conventional CIE XYZ space as described above. For example, a Yule-Nielsen model may be used.

The above method may provide a colorimetric interface for converting CIE Lab values to NPacs. Such interface may be analogous to an ICC profile's reverse look-up-table, i.e. a PCS to device table, which is applied in current pipelines. Hence, certain embodiment of the above described color separation feature may be readily integrated with existing print system pipelines. Furthermore, use of the table 10 may prevent that an ICC profile needs to be generated for the substrate, e.g. with a CMYK or RGB interface, so that an additional possibly compromising color conversion may be prevented and color output may be further improved.

In a first aspect, a method of generating a CIE Lab to Neugebauer primaries interface for a print system 1 may be provided. Such method may comprise (i) selecting area coverages of Neugebauer Primaries and printing corresponding patches, (ii) measuring the CIE XYZ coordinates of the patches, (iii) converting the CIE XYZ coordinates to corresponding CIE Lab coordinates, and (iv) relating the CIE Lab coordinates to the NPacs.

In a second aspect, a method of passing print data through a printer pipeline may be provided. Such method may comprise (i) converting input image data to CIE Lab data, (ii) converting the CIE Lab data to corresponding area coverages of Neugebauer Primaries (NPacs) by referring to a table 10 that has linked CIE Lab values to corresponding NPacs, using the CIE Lab coordinates as indexing space and the NPacs as nodes, (iii) halftoning the NPacs comprising outputting one Neugebauer Primary (NP) per halftone pixel, and (iv) distributing ink drops corresponding to the NPs onto a substrate 4.

In a third aspect, a print system 1 may be provided. Such print system 1 may comprise (i) a storage device 7 having stored thereon a table 10 that has linked CIE Lab values to corresponding NPacs that are available on the print system 1, and (ii) a processing circuit 6 arranged to instruct the print system 1 to perform a method comprising (i) converting input image data to CIE Lab data, (ii) converting the CIE Lab data to corresponding area coverages of Neugebauer Primaries (NPacs) by referring to the table 10 that has linked CIE Lab values to corresponding NPacs, (iii) halftoning the NPacs, for example by outputting one Neugebauer Primary (NP) per halftone pixel, and (iv) distributing ink drops corresponding to the NPs onto a substrate 4.

In a fourth aspect, a computer program product may be provided, which may comprise (i) a table 10 that has linked CIE Lab values to corresponding NPacs that are available on the print system 1, and (ii) an algorithm configured to instruct a processing circuit 6 to (i) convert input image data to CIE Lab data, (ii) convert the CIE Lab data to corresponding area coverages of Neugebauer Primaries (NPacs) by referring to the table 10 that has linked CIE Lab values to corresponding NPacs, (iii) halftone the NPacs, for example by outputting one Neugebauer Primary (NP) per halftone pixel. The computer program product may comprise, but is not limited to, software, drivers, and/or data saved on a storage device or data carrier.

As will be understood by the skilled person, in the above description and in the claims, the term "optimizing" should be understood as an act of improving or trying to reach an optimal by performing certain steps. It should not be understood as an act of reaching a certain undisputable optimal solution.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, while a reference to a certain number of elements does not exclude the possibility of having more elements. A single unit may fulfil the functions of several items recited in the disclosure, and vice versa several items may fulfil the function of one unit.

The mere fact that certain measures are recited in mutually different dependent claims does not indicate that a combination of these measures cannot be used to advantage. Multiple alternatives, equivalents, variations and combinations may be made without departing from the scope of the invention.

What is claimed is:

1. Method of generating a CIE Lab to NPac interface for a print system, comprising:
    selecting area coverages of Neugebauer Primaries and printing corresponding patches;
    measuring CIE XYZ coordinates of the patches;
    generating a convex hull in CIE XYZ space from the measurements;
    converting the CIE XYZ coordinates to corresponding CIE Lab coordinates so as to generate a CIE Lab convex, and relating the CIE Lab coordinates to the Neugebauer Primaries area coverage (NPac) vectors;
    computing a uniform CIE Lab grid of a predetermined resolution, finding CIE Lab grid points outside of the CIE Lab convex hull and mapping those onto the CIE Lab convex hull boundary;
    mapping CIE XYZ coordinates that correspond to CIE lab grid points, but that are outside of the CIE XYZ convex hull, onto the CIE XYZ convex hull; and
    converting those mapped CIE XYZ coordinates into CIE Lab so that all CIE Lab grid points have a CIE XYZ equivalent that is in or on the CIE XYZ convex hull.

2. Method according to claim 1, comprising in a first step, tessellating the CIE XYZ convex hull, and in a second step, interpolating CIE XYZ coordinates that correspond to the respective CIE LAB grid points using the tessellation of the first step.

3. Method according to claim 1, comprising generating a look up table for mapping CIE lab coordinates to NPac vectors, wherein the CIE Lab coordinates form an indexing space and the NPac vectors form nodes.

4. A system comprising non-transitory computer-readable storage media encoded with code to, when executed by a processor, implement the method of claim 1.

* * * * *